US010809106B2

(12) United States Patent
Stuyvenberg et al.

(10) Patent No.: US 10,809,106 B2
(45) Date of Patent: Oct. 20, 2020

(54) ULTRASONIC FLOW METER CONFIGURED TO FACILITATE MEASUREMENT ELECTRONICS REPLACEMENT (71) Applicant: Badger Meter, Inc., Milwaukee, WI (US)

(72) Inventors: Matthew Stuyvenberg, Menomonee Falls, WI (US); Eric M. Metzger, Franklin, WI (US); Chad Michael Ellertson, Saint Francis, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 16/278,296

(22) Filed: Feb. 18, 2019

(65) Prior Publication Data
US 2020/0264021 A1   Aug. 20, 2020

(51) Int. Cl.
*G01F 1/66* (2006.01)
(52) U.S. Cl.
CPC .............. *G01F 1/662* (2013.01); *G01F 1/667* (2013.01)
(58) Field of Classification Search
None
See application file for complete search history.

(56) References Cited

U.S. PATENT DOCUMENTS

| | | | | |
|---|---|---|---|---|
| 7,819,021 | B2 * | 10/2010 | Sonnenberg | G01F 1/74 73/861.26 |
| 2005/0210999 | A1 * | 9/2005 | Sylvia | G01F 1/662 73/861.29 |
| 2008/0307911 | A1 | 12/2008 | Allen | |
| 2009/0133506 | A1 * | 5/2009 | Rhodes | G01F 1/667 73/861.18 |
| 2010/0257942 | A1 * | 10/2010 | Straub, Jr. | H01L 41/0475 73/861.28 |
| 2012/0006127 | A1 * | 1/2012 | Nielsen | G01F 1/662 73/861.27 |
| 2012/0125121 | A1 * | 5/2012 | Gottlieb | G01F 1/662 73/861.28 |
| 2013/0098167 | A1 | 4/2013 | McDonald et al. | |
| 2013/0139610 | A1 * | 6/2013 | Laursen | G01F 1/662 73/861.18 |
| 2013/0180340 | A1 * | 7/2013 | Allen | G01F 1/667 73/861.18 |

(Continued)

FOREIGN PATENT DOCUMENTS

JP   2012163518   8/2012

*Primary Examiner* — Harshad R Patel
(74) *Attorney, Agent, or Firm* — Boyle Fredrickson, S.C.

(57) ABSTRACT

An ultrasonic flow meter is configured to facilitate replacement of flow measurement electronics. The flow meter includes flow measurement electronics including a plurality of transducer assemblies transmitting and receiving ultrasonic waves through a flow for ultrasonic measurement of the flow and a flow meter body. The flow meter body includes a conduit providing a flow passage through the flow meter body, an electronics receptacle configured to receive the flow measurement electronics to form an electronics housing compartment, a plurality of transducer housings configured to receive transducer assemblies and position one or more transducers of the transducer assemblies relative to the conduit, and at least two pass-through apertures directly between the electronics housing into each of the plurality of transducer housings.

20 Claims, 5 Drawing Sheets (56) References Cited

U.S. PATENT DOCUMENTS

| | | | |
|---|---|---|---|
| 2015/0082880 A1* | 3/2015 | Allen | G01F 15/14 |
| | | | 73/273 |
| 2015/0143919 A1 | 5/2015 | Nakano et al. | |
| 2015/0276454 A1* | 10/2015 | Laursen | G01D 4/02 |
| | | | 73/201 |
| 2017/0030749 A1* | 2/2017 | Joshi | G01F 1/662 |
| 2017/0030755 A1* | 2/2017 | Grewal | G01F 15/18 |
| 2017/0030756 A1* | 2/2017 | Joshi | G01F 15/14 |

* cited by examiner

ULTRASONIC FLOW METER CONFIGURED TO FACILITATE MEASUREMENT ELECTRONICS REPLACEMENT

FIELD OF THE INVENTION

This application relates to ultrasonic metering equipment for measuring flow through a conduit using ultrasonic transmitters and receivers. More specifically, this application relates to an ultrasonic flow meter configured to facilitate replacement of electronics implementing flow measurement and associated activities.

BACKGROUND

Flow measurement is used for a variety of purposes including, for example, determining usage of a commodity, such as gas or water, by a utility company, controlling dispensation amounts for mixing operations, etc. Flow meters are used to measure the flow of a fluid or gas through a conduit. The measured flow is typically communicated to one or more external systems for recordation, further processing, etc.

Ultrasonic flowmeters include flow measurement electronics and at least one ultrasonic transmitter/receiver pair, also referred to as transducers, transmitting and receiving ultrasonic signals through a conduit through which a fluid or gas to be measured is being transported. The ultrasonic flowmeter may be clamped on an existing conduit or implemented to include a meter body inserted in between two sections of conduit transporting the fluid or gas and transporting the fluid or gas through the meter body. The ultrasonic flow meter is configured to align the ultrasonic transmitter/receiver pair(s) at specific locations on or in the meter body and/or flowmeter conduit such that ultrasonic waves generated by transmitters are received by receivers after travelling a defined path through at least the fluid or gas and through the conduit walls as needed.

Each transducer in a transmitter/receiver pair is connected to the flow measurement electronics, typically using two-wire or three-wire cabling. The cabling extends from an end connector of each transducer to the flow measurement electronics, typically separately housed in an electronics housing enclosure.

However, flow meters are often subjected to challenging environmental conditions such as extreme heat or cold, damp or frequently submerged locations, and chemically active locations, such that flow meter electronics, cabling, housings, apertures, etc. are subject to the same environment. Flow meters may also be subjected to tampering, external forces and/or vibrations, etc. if left exposed, the transducers and cables are susceptible to being damaged and/or prematurely worn. Further, cabling ingress and egress points must be sealed such that internal components such as the measurement electronics are not damaged. To provide the level of protection that is desirable, flow meters are typically sealed in such a manner that components are not replaceable. For example, electronics are either epoxied in place or sealed such that the whole device is to be replaced if, for example, either the battery has reached the end of life and/or any other issues occur that would create a terminal failure or other performance issue for the flow meter.

Even without such sealing, component replacement remains difficult. Flow meters are often provided in environments that have may restricted access, such as in a pit, in a submerged location, and crowded among other machinery. As such, field replacement of components, particularly in view of the challenging environment and placement/orientation requirements. As such, flow meters are typically configured such that failure of any component of a flow meter requires removal and/or replacement of the entire flow meter to address the failure even where the failure is not based on a sealed component failure.

What is needed is an ultrasonic flow meter configured to facilitate replacement of electronics used in flow measurement. What is further needed in such a flowmeter configured to facilitate routing and protection of transducer/receiver pairs and associated cabling to connect with flow measurement electronics.

SUMMARY OF THE INVENTION

This invention is directed to a mechanical implementation of an ultrasonic flow meter including a pressure vessel and flow measurement electronics that allow for the flow measurement electronics to be made and sealed as a sub-assembly (sub-assembly including a main processing board, a display, a battery, ultrasonic transducers, and any auxiliary sensors) to facilitate replacement. The pressure vessel is constructed to have sufficiently sized passageways into side firing transducer pockets to allow the transducers to pass through while maintaining a sealed package for the electronics.

In one embodiment, the invention is an ultrasonic flow meter configured to facilitate replacement of flow measurement electronics. The flow meter includes flow measurement electronics including a plurality of transducer assemblies transmitting and receiving ultrasonic waves through a flow for ultrasonic measurement of the flow and a flow meter body. The flow meter body includes a conduit providing a flow passage through the flow meter body, an electronics receptacle configured to receive the flow measurement electronics to form an electronics housing compartment, a plurality of transducer housings configured to receive transducer assemblies and position one or more transducers of the transducer assemblies relative to the conduit, and at least two pass-through apertures directly between the electronics housing into each of the plurality of transducer housings.

In another more detailed aspect, the diameter of the pass-through aperture is greater than a diameter of the transducers such that the transducers may be passed from the electronics housing to the transducer housing through a pass-through aperture during the mounting of the flow measurement electronics to the electronics receptacle.

In another more detailed aspect, each transducer assembly includes at least two transducers in the transducer assembly and each transducer housing includes at least two transducer apertures.

In another more detailed aspect, each pass-through aperture includes a wiring space along the diameter of the pass-through aperture configured to receive a transducer wire of a first transducer during passage of a second transducer through the pass-through aperture during the mounting of the flow measurement electronics to the electronics receptacle.

In another more detailed aspect, the transducers are prewired the flow measurement electronics prior to mounting of the flow measurement electronics to the electronics housing.

In another more detailed aspect, the transducer housing includes a cover plate enclosing the transducer housing to form a watertight transducer housing compartment within the transducer housing.

In another more detailed aspect, the cover plate is configured to enclose one or more wires connected between the one or more transducers and the measurement electronics.

In another more detailed aspect, the pass-through aperture is provided through a wall between the transducer housing compartment and the electronics housing compartment.

In another embodiment, the invention provides an ultrasonic flow meter body configured to facilitate replacement of flow measurement electronics. The flow meter body includes a conduit providing a flow passage through the flow meter body, an electronics receptacle configured to receive flow measurement electronics to form an electronics housing compartment, a plurality of transducer housings configured to receive transducer assemblies and position one or more transducers of the transducer assemblies relative to the conduit, and at least two pass-through apertures directly between the electronics housing into each of the plurality of transducer housings.

In another embodiment, the invention provides an ultrasonic flow meter configured to facilitate replacement of flow measurement electronics. The flow meter includes flow measurement electronics including a plurality of transducer assemblies transmitting and receiving ultrasonic waves through a flow for ultrasonic measurement of the flow, the electronics further including an electronic circuit embodied on a printed circuit board wherein the transducer assemblies are wired to the printed circuit board and the printed circuit board is potted within an electronics housing of the flow measurement electronics. The ultrasonic flow meter further includes a flow meter body including a conduit providing a flow passage through the flow meter body, an electronics receptacle configured to receive the flow measurement electronics to form an electronics housing compartment, a plurality of transducer housings configured to receive transducer assemblies and position one or more transducers of the transducer assemblies relative to the conduit, and at least two pass-through apertures directly between the electronics housing into each of the plurality of transducer housings.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE INVENTION

Figure 1:
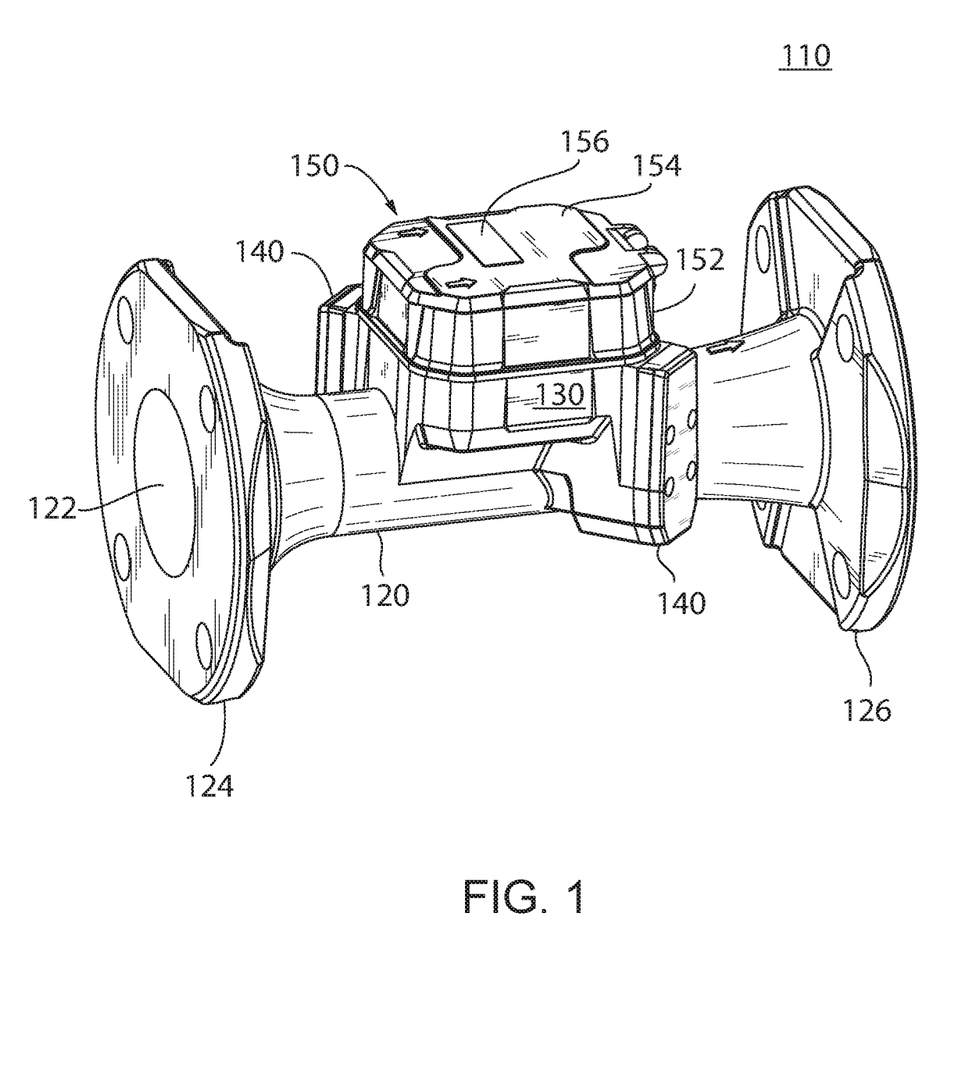
FIG. 1 is a perspective view of a portion of a metered system including an ultrasonic flow meter, according to an exemplary embodiment.

FIG. 1 is a perspective view of a portion of an ultrasonic flow meter 110, according to an exemplary embodiment.

The ultrasonic flow meter 110 may be installed in a metered system configured to supply a fluid or gas to an end user or system. The metered system may be, for example, a portion of a utility supply network delivering utility service to customers where the ultrasonic meter 110 is used to measure utility consumption by customer, may be a portion of a formulation system where the ultrasonic meter 110 is used to measure an amount to be used in a formulation, etc.

Ultrasonic meter 110 includes a meter body 120 defining a conduit 122 therethrough, a metering electronics receptacle 130, and a plurality of transducer housings 140 with two transducer housings 140 being shown in the exemplary embodiment. Ultrasonic meter 110 measures the velocity of a fluid or gas though conduit 122 using ultrasound generate by at least one pair of transducers to calculate volume flow. Ultrasonic meter 110 measures an average and/or instantaneous velocity along the path of an ultrasonic beam emitted by a pair of transducers within the transducer housings 140 by averaging the difference in measured transit time between the pulses of ultrasound propagating upstream and downstream in the direction of flow through the conduit 122. Ultrasonic meter 110 may also measure using doppler shift, where doppler shift measures the difference in frequency of the sound wave, as reflected off gas bubbles or particles in the flow stream, suitable for aerated or liquids having particulates therein.

Meter body 120 includes an upstream end 124 to be connected to an upstream network conduit (not shown) and a downstream end 126 connected to a downstream network conduit (not shown). The ends 124, 126 of the meter body 120, although shown as including coupling flanges, may be spud ends including threaded couplings or any other type of coupling know in the art. The type of couplings may be selected based on the size, environment, application, etc. for the meter 110.

Meter body 120 may be formed from bronze, cast iron, ductile iron, plastics, plastic polymers, etc. as are known in the art. Meter body 120 may be configured to be totally encapsulated, weatherproof and UV-resistant. Meter body 120 may be formed to include both the metering electronics receptacle 130, and transducer housings 140.

Measurement electronic receptacle 130 is configured to receive and at least partially enclose flow measurement electronics 150 such that measurement electronics 150 is mounted on and at least partially within electronics receptacle 130. In an exemplary embodiment, flow measurement electronics 150 is a solid state, ultrasonic measurement system as further described below with reference to FIGS. 3 and 4. Flow measurement electronics 150 includes an electronics housing 152, further discussed below with reference to FIGS. 2-5, and an electronics housing cover 154. Flow measurement electronics further included at least one transducer assembly cabled thereto as also described below with reference to FIGS. 3-5.

As water flows into the measuring tube, meter body 120, through the upstream end 124, ultrasonic signals are sent consecutively in forward and reverse directions of flow, by transducers housed in transducer housings 140, prior to the water exiting the meter body 120 through downstream end 126. Velocity of the water is then determined by measuring the time difference between the measurement in the forward and reverse directions at the measurement electronics 150. Total flow volume is calculated from the measured flow velocity using water temperature and pipe diameter.

Figure 2:
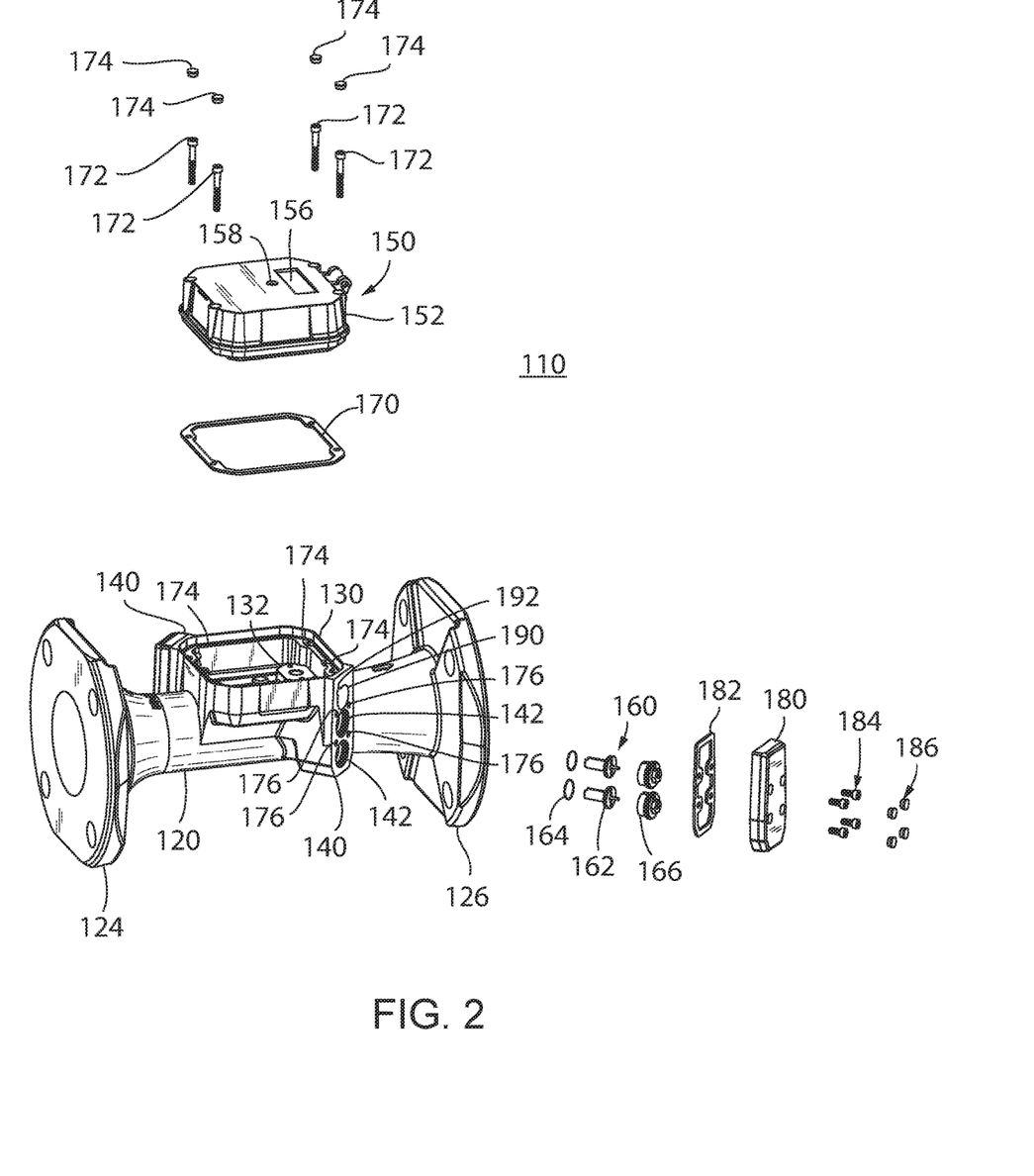
FIG. 2 is an exploded view of the ultrasonic meter of FIG. 1, according to an exemplary embodiment.

Referring now to FIG. 2, FIG. 2 is an exploded view of the ultrasonic meter 110 of FIG. 1, according to an exemplary embodiment. As shown, meter body 120 of ultrasonic meter 110 is a unitary casting. Unitary casting provides advantages and strength and robustness for the meter body 120. However, unitary casting has the effect of making the meter body 120 a relatively expensive and large component of the ultrasonic meter 110, such that removal and/or replacement of the meter body is undesirable. Accordingly, meter body 120 is formed to facilitate removal and replacement of flow measurement electronics 150 including transducer assemblies 160.

Referring first to flow measurement electronics 150, measurement electronics 150 is shown with flow measurement electronics cover 154 removed for illustration purposes. Flow measurement electronics 150 includes an LCD display 156 embedded in housing 152 that displays the total volume and alarm conditions and can toggle to display rate of flow and/or any additional calculated information. For example, the display 156 may be configured for displaying a measured rate of flow, a reverse-flow indication, alarms, etc. as are known in the art. Flow measurement electronics 150 further includes an infrared (IR) port 158 on the housing 152 for one method sending and receiving data external to the ultrasonic meter 110.

Measurement electronics 150 is configured to seat partially within metering electronics receptacle 130 the measurement electronics 150 and electronic receptacle 130 cooperate to form a watertight seal. As such, an electronics housing gasket 170 is provided between electronic receptacle 130 and measurement electronics 150 to facilitate the watertight seal. Measurement electronics 150 is attached to electronics receptacle 130 using plurality of attachment screws 172 passing through the measurement electronics housing 152 into a plurality of screw attachment points 174 provided within electronics receptacle 130. During attachment, screws 172 are tightened to secure measurement electronics 152 electronics receptacle 130, compressing electronics housing gasket 170 to provide the watertight sealing. Following attachment, tamper-resistant screw covers 174 are used to prevent unauthorized removal and/or access to the attached measurement electronics 150.

Electronics receptacle 130 includes a pressure sensor mounting aperture 132. The pressure sensor mounting aperture is configured to receive a pressure sensor prewired and attached to measurement electronics 150 as a component thereto. The pressure sensor is shown and discussed in further detail below with reference to FIG. 4.

Transducer assemblies 160 are configured to seat entirely within transducer housings 140. Transducer assemblies 160 include one or more transducers 162 and, for each transducer 162, a transducer seating gasket 164 and transducer locking nut 166. When assembled, transducer assemblies 160 are positioned entirely within transducer housings 140, also shown and described in further detail below with reference to FIG. 5. The transducer assemblies 160 are also prewired and attached to measurement electronics 150 as a component thereto. The pressure sensor is shown and discussed in further detail below with reference to FIG. 4.

Transducers 162 are fitted with a transducer seating gasket 164 in position within transducer apertures 142 of the transducer housing 140. Transducers 162 are held in place within transducer apertures 142 by transducer locking nuts 166. Locking nuts 166 are configured to include wiring slots allowing the wire of the prewired transducers 162 to pass-through locking nuts 166. Locking nuts 166 are configured to compress transducers 162 within transducer apertures 142 such that transducer seating gasket 164 is compressed and forms a watertight seal. When mounted, a front end of the transducer 162, opposite the wired back end, is positioned within conduit 122 or a portion of the transducer aperture 142 in fluid communication with conduit 122. The front end of the transducer 162 is positioned on a fluid side of the transducer 142, separated by the transducer seating gasket 164 from the back end of the transducer 163 within the transducer housing 140.

Transducer housings 140 and a transducer housing covers 180 cooperate to form a watertight seal. As such, a transducer housing gasket 182 is provided between transducer housing 140 and transducer housing cover 180 to facilitate the watertight seal. Transducer housing cover 180 is attached to transducer housing 140 using a plurality of attachment screws 184 passing through the transducer housing cover 180 into a plurality of screw attachment points 186 provided within transducer housing 140. During attachment, screws 184 are tightened to secure transducer housing cover 180, compressing transducer housing gasket 182 to provide the watertight sealing. Following attachment, tamper-resistant screw covers 174 are used to prevent unauthorized removal and/or access to the attached measurement electronics 150.

Figure 4:
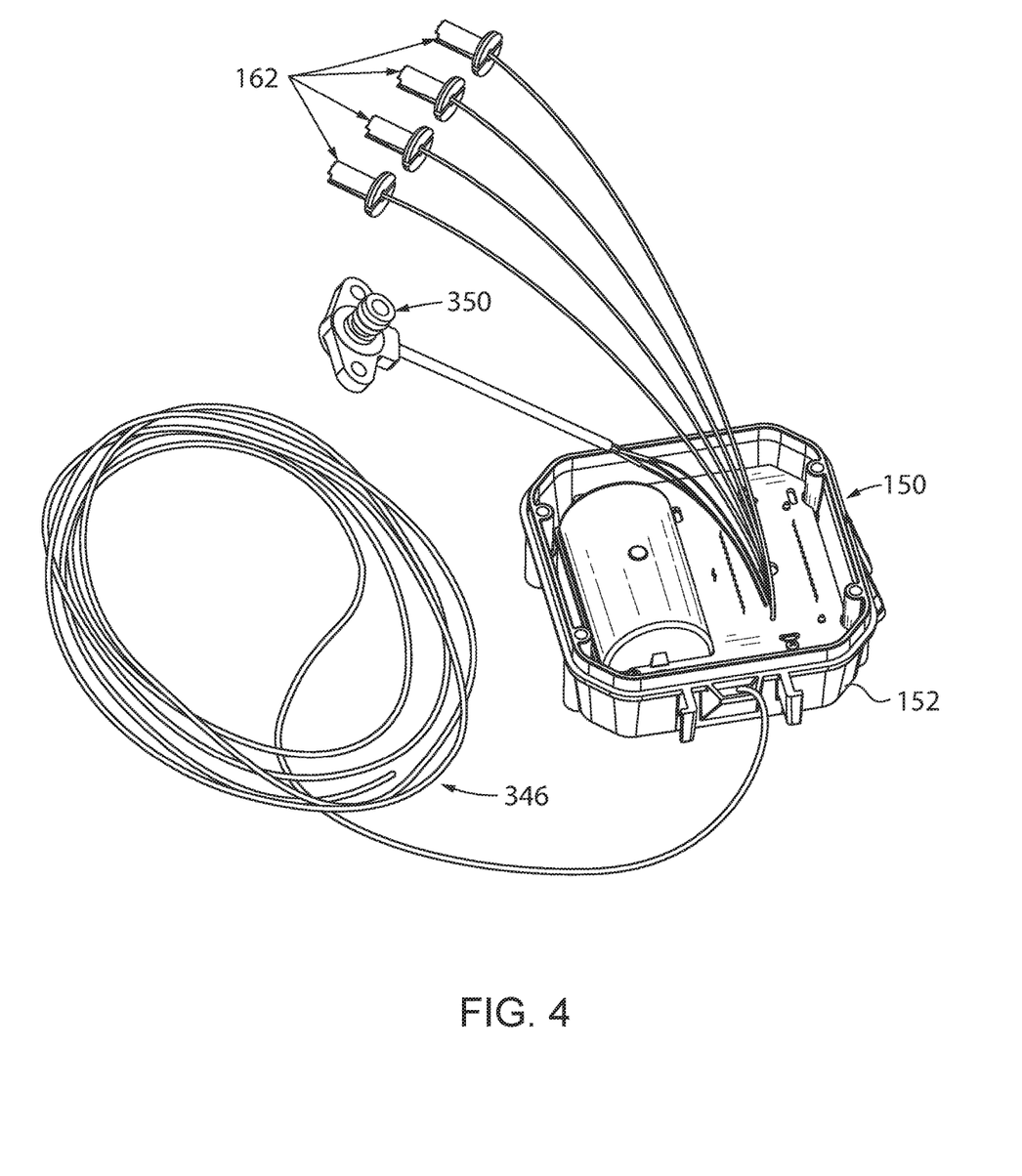
FIG. 4 is a perspective view of an assembled and potted measurement electronics including cabling, according to an exemplary embodiment.
Figure 5:
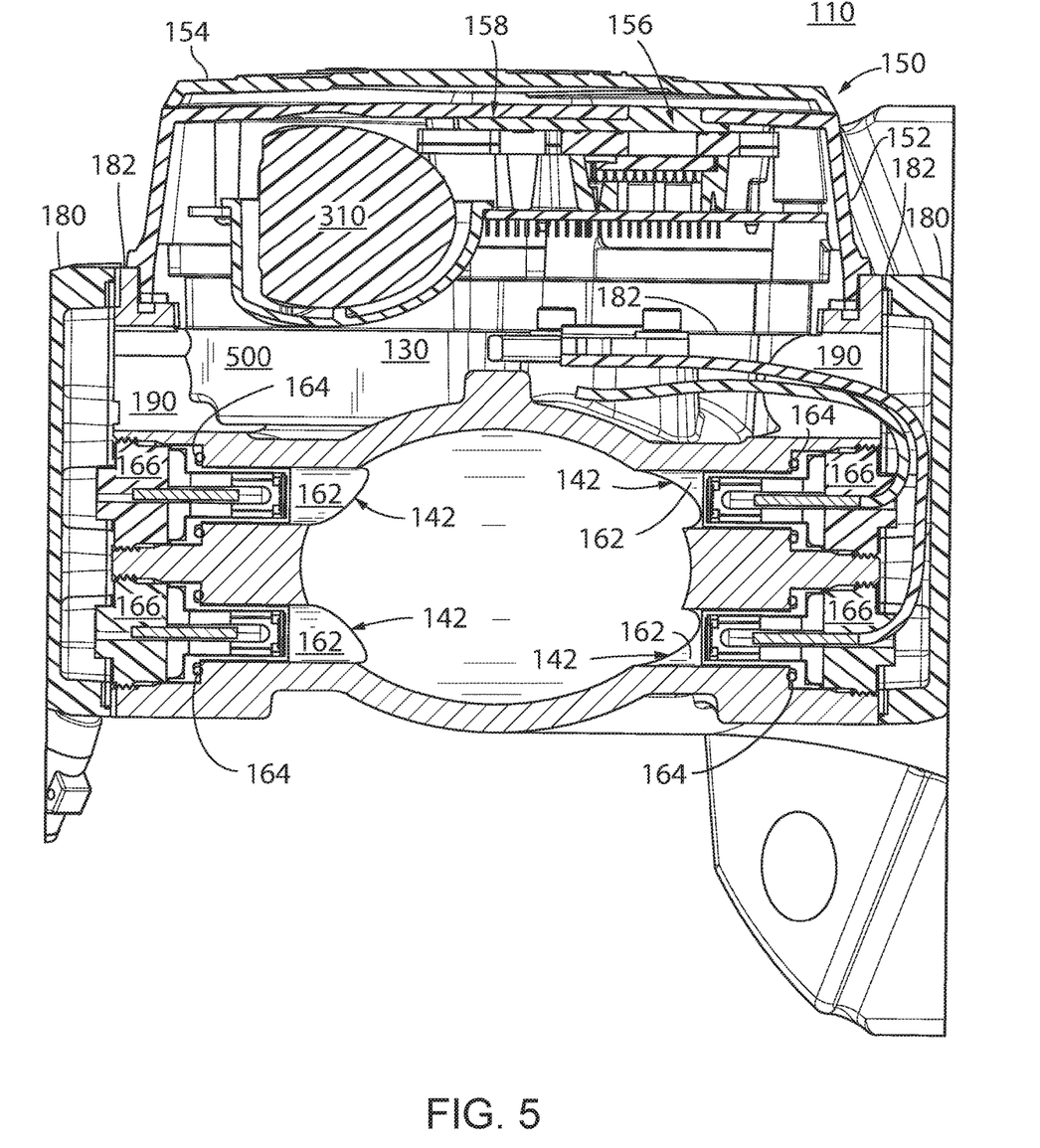
FIG. 5 is a cutaway perspective view of an assembled ultrasonic flow meter of FIG. 1, bisected on a line between transducer housings, according to an exemplary embodiment.

According to a preferred embodiment, transducer assemblies 160, in particular transducers 162 have a wired connection to measurement electronics 150 such that the transducers 162 are components of the measurement electronics 150, as shown in FIGS. 4-5. Transducers 162 are configured to be wired to measurement electronics 150 prior to installation of measurement electronics 150 within electronics receptacle 130 such that prewired transducers 162 pass through a sealed electronic receptacle 130 directly into sealed transducer housings 140. Advantageously, utilization of prewired transducers 162 that passed through electronic receptacle 130 into transducer housings 140 eliminates the need for additional watertight sealing that would otherwise be needed for wiring ingress and egress points in both of electronic receptacle 130 and sealed transducer housing 140.

As shown in FIG. 2, a transducer assembly 160 may include a plurality of transducers 162 and associated components. In alternative embodiments, a transducer assembly 160 may include more or less than the two transducer assemblies shown in FIG. 2 and each transducer assembly may include more or less than the two transducers 162. Meter body 120 may also be reconfigured based on the number of transducer assemblies and transducers for each assembly, where meter 110 only a single transducer 162, transducer housing 140 may be reconfigured for the transducer assembly 160 to only include a single transducer aperture 142 for an assembly having a single transducer 162.

Meter body 120 is configured to include at least two transducer pass-through apertures 190 providing a direct passage from electronics receptacle 130 to each of the transducer housings 140. The direct passage is such that one side of the apertures 190 opens to a first side of a wall between electronics receptacle 130 and one of the transducer housings 140 and the opposite side of the aperture 190 opens to the opposite side of the same wall.

Transducer pass-through aperture 190 is configured such that the diameter of aperture 190 is slightly greater than the diameter of prewired transducers 162 where, during attachment of measurement electronics 150 to electronics receptacle 130, prewired transducers 162 are inserted through electronics receptacle 130 into transducer housings 140 entirely within meter body 120. In one exemplary embodiment, transducer pass-through aperture 190 is in turn configured to include a wiring space on the outside diameter of aperture 190, such as wiring notch 192, shown in FIG. 2. The wiring space may be sized and/or positioned such that the wire for a first prewired is transducer 162 may be positioned within the wiring space while a second prewired transducer 162 is being passed through transducer pass-through aperture 190.

Figure 3:
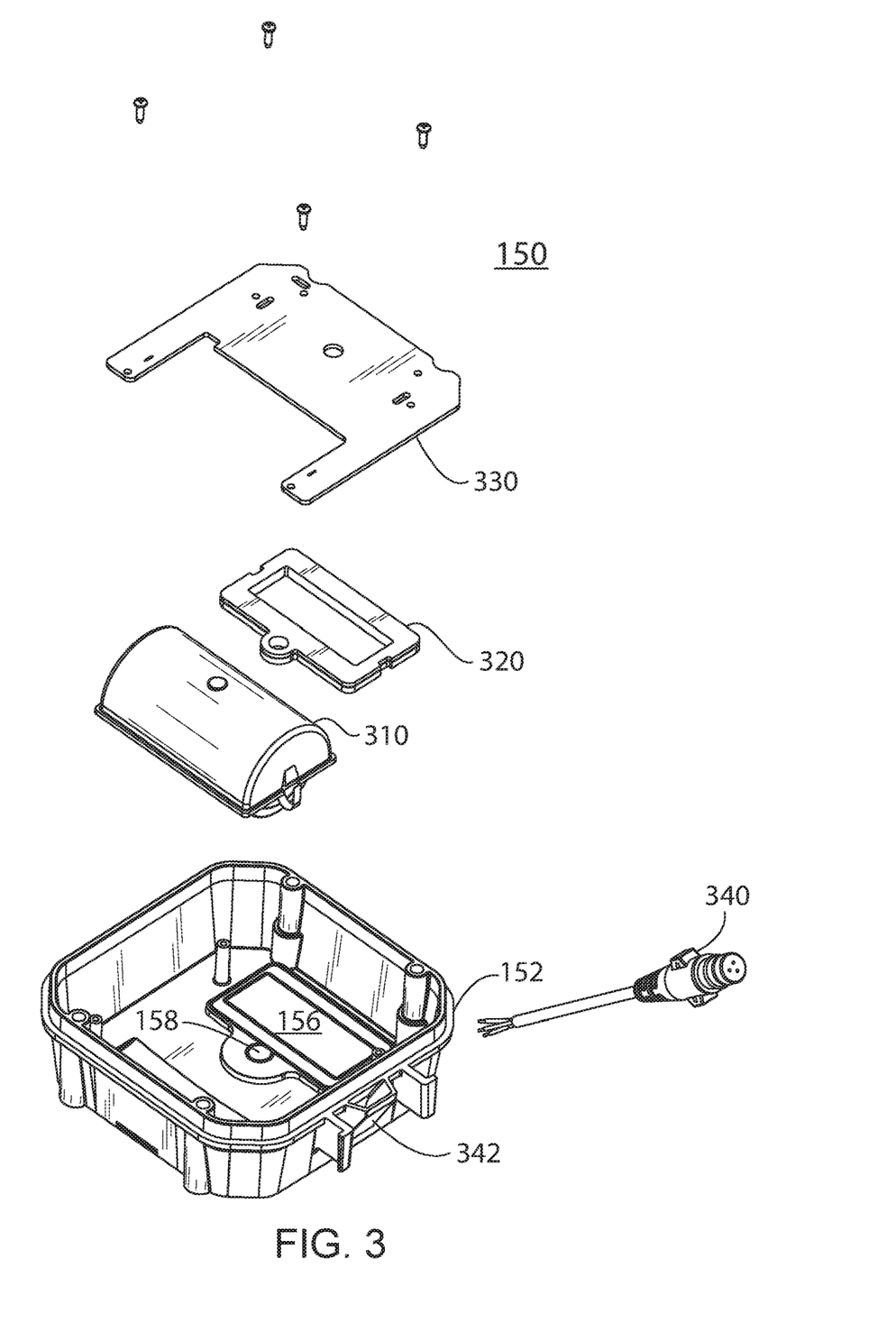
FIG. 3 is an exploded view of the measurement electronics for the flow meter of FIG. 1, according to an exemplary embodiment.

Referring now to FIG. 3, FIG. 3 is an exploded view of the measurement electronics 150 of FIG. 1, according to an exemplary embodiment. As shown, measurement electronics 150 includes measurement electronics housing 152, including IR port 154 and LCD screen 156, battery 310, LCD gasket 320 and measurement electronics printed circuit board assembly (PCBA) 330. Measurement electronics 150 includes all of the electronic components for performing the ultrasonic flow measurement according to an exemplary embodiment. Specifically, measurement electronics 150 may include and be prewired to a plurality of transducer assemblies 160, a pressure sensor as shown in FIG. 4, and a transceiver connector 340 configured to connect to a radio transceiver assembly.

Referring now also to FIG. 4, a perspective view of an assembled measurement electronics 150 is shown, according to an exemplary embodiment. As shown in FIG. 4, measurement electronics 150 components 310-330 are assembled in the measurement electronics housing 152 and potted to further guard against moisture affecting measurement electronics 150. Potting includes filling, at least partially, electronics housing 152 with a solid or gelatinous compound for resistance to shock and vibration to prevent damage from moisture and corrosive agents. Electronics housing 152 is filled to a level where the components are potted for protection. As is also shown, PCBA 330 is wired to additional components enabling the ultrasonic flow measurement function, including but not limited to transducers, sensors, and communication components.

Referring now to both FIG. 3 and FIG. 4, measurement electronics 150 includes measurement PCBA 330 configured to include circuitry programmed to implement the flow measurement function. For example, where the ultrasonic flow meter 110 is used in a utility supply network, the measured and calculated values, including the flow value, are received by PCBA 330 and converted to electrical pulses which are counted as units of consumption of water. These signals are transmitted through transceiver connector 340 configured to connect to a radio transceiver assembly that may be implemented as a separate assembly. In alternative embodiments, these signals can also be transmitted through an internal radio transceiver that is assembled with the measurement electronics 150 within housing 152 or an integrated housing, such as meter housing 120. The radio transceiver may include a radio transmitter portion and a radio receiver portion. The radio transmitter portion converts the measurement system signals to a radio frequency signaling protocol for transmission back to a network data collector through a wireless network. The radio receiver portion receives signals controlling the operation of PCBA 330 such as firmware updates, transmission schedules.

Battery 310 may be any type of battery powering the components of measurement electronics 150 and external components wired thereto. Battery 310 may be configured to be sufficient for measurement and transmission functions while also having an effective life of up to 10 years. Accordingly, battery 310 may be a combination of high-energy density cells and one or more rechargeable electric cells. Battery 310 may be provided within a water-tight casing and/or at least partially potted prior to insertion within electronics housing 152 such that the battery 310 may extend out of measurement electronics housing 152 and into electronics receptacle 130 without increasing the overall size requirements of housing 152 while being fully potted and protected.

LCD gasket 320 is a gasket that can be formed from a microcellular polyurethane foam. LCD gasket 320 provides a seal to keep the potting material within measurement electronics housing 152 outside the space in front of the LCD display 156 as well as keeping a pre-potting material, such as a urethane potting material, on the back side of the LCD display 156. LCD gasket 320 is provided for sealing, load distributing, gap filling, mechanical shock protection and over-press cushioning for LCD panel 156 as is known in the art.

PCBA 330 includes an electronic circuit configured for performing measurement related operations. PCBA 330 is configured to determine and communicate flow within conduit 122. To perform these operations, PCBA is configured to control flow measurement detection and communication components, such as ultrasound transducers 162, a radio transmitter, etc. The electronic circuit is specifically configured for control and communication with ultrasound transducers, such as transducer housings 140. Although described herein as being performed by a circuit embedded on PCBA 330, the functionality described as being performed by the electronic circuit may be performed in alternative embodiments using firmware, software, etc. stored in non-transitory memory and implemented by a computer processor programmed with the software to implement the functionality described herein.

As shown in FIG. 3, electronics housing 152 may be configured to include a transceiver connector aperture 342 configured to provide a pass-through transceiver connector 340 from electronics housing 152 within measurement electronics 150 to outside of measurement electronics 150 without passing through electronics receptacle 130. Transceiver connector 340 passes through aperture 342 since this connector connects to an external system that is not within electronics receptacle 130 or a transducer housing 140.

Referring specifically to FIG. 5, PCBA 330 is configured to include input output cabling for each transducer assembly wherein each transducer assembly includes two prewired transducers 162. Advantageously, prewired transducers may include shielded wiring, one end of which is encapsulated and entirely covered within transducer 162 at the attachment point to the transducer 162. PCBA 330 may further include a pressure sensor wiring including a prewired pressure sensor. PCBA 330 may have further include a transceiver wire configured to send and receive information between measurement electronics 152 and an external transmitter/receiver assembly.

According to exemplary embodiment, all input and output cabling for measurement electronics 150 may be wired to the circuit board 330 prior to the above described potting for a measurement electronics 150. Because all of the wiring to PCBA 330 is completed prior to the potting operation, the wiring ends at the circuit board side are protected from wear and or exposure by the potting material. Similarly, the wiring to PCBA 330 may be completed at the components prior to mounting of the measurement electronics 150 within the meter body 110 such that the wiring ends at the component side are similarly protected from wear and or exposure by any housing and/or sealing for the component. This advantage is made possible because of the specific configuration of the meter body 110 allowing passage of prewired components from the electronics receptacle 130 to, for example, transducer housings 140. For example, measurement electronics 150, as shown in FIG. 4, may include a pressure sensor 350 wired to PCBA 330 prior to potting of measurement electronics 150.

Referring now to FIG. 5, a cutaway version of an assembled ultrasonic flow meter 110 of FIG. 1, bisected on a line between the transducer housings 140, is shown, according to an exemplary embodiment. The potting material within measurement electronics 150 has been removed for illustrative purposes.

As shown, cover 154 may be attached by a hinge to measurement electronics housing 152. In the closed position, cover 154 covers and protects LCD display screen 156 and IR port 158. The hinged attachment allows cover 154 to be opened to interact with LCD display 156 and to send and receive data with PCBA 330 using IR port 158.

In the mounted position shown in FIG. 5, measurement electronics 150 and electronics receptacle 130 form a watertight electronics chamber 500 sealed by gasket 170 such that the only open passages to the watertight electronics chamber 500 are pass-through apertures 190.

As also shown in FIG. 5, transducer assemblies 160 and transducer housing cover 180. Transducers assemblies 160 are shown with transducers 162 mounted within transducer housing 140. Specifically, transducers 162 are shown mounted within transducer apertures 142. Transducers 162 are secured within apertures 142 by locking nuts 166 which also form a compression seal at each transducer aperture 142 by compression of transducer seating gasket 164. Transducer housing cover 180 is shown attached to transducer housing 142 former compression seal by compression of transducer housing gasket 182. As described, flowmeter 110 includes two watertight transducer chambers 510 such that the only open passages are pass-through apertures 190.

Advantageously, the configuration of meter body 120 facilitates replacement of measurement electronics 150 including prewired transducer assemblies 160 and additional input output cabling as needed. Prior to mounting of measurement electronics 150, pressure sensor 350 can be attached to pressure mount 132 within electronics receptacle 130. With transducer housing covers 180 removed, transducers 162 may be passed through pass-through apertures 190 and positioned within transducer apertures 142, secured by locking nuts 166. As seen in FIG. 5, the cabling for each transducer 162 is prewired and completely enclosed within the transducer 162. As such, the cabling for each transducer 162 passes through the above described wiring slot in each locking nut 166. Transducer housing cover 180 is configured such that the cabling for each transducer 162 is enclosed within a watertight transducer chamber 510 without impingement between transducers 162 and pass-through apertures 190.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. An ultrasonic flow meter configured to facilitate replacement of flow measurement electronics, the flow meter comprising:
    flow measurement electronics including
        an electronics housing and
        a plurality of transducer assemblies transmitting and receiving ultrasonic waves through a flow for ultrasonic measurement of the flow; and
    a flow meter body including
        a conduit providing a flow passage through the flow meter body,
        an electronics receptacle configured to receive the flow measurement electronics to form an electronics chamber,
        a plurality of transducer housings configured to receive transducer assemblies and position one or more transducers of the transducer assemblies relative to the conduit, and
        at least two pass-through apertures, each pass-through aperture providing an opening directly between the electronics chamber and a different transducer housing of the plurality of transducer housings.

2. The ultrasonic flow meter of claim 1, wherein a diameter of the pass-through aperture is greater than a diameter of the transducers such that the transducers may be passed from the electronics chamber to the transducer housing through a pass-through aperture during the mounting of the flow measurement electronics to the electronics receptacle.

3. The ultrasonic flow meter of claim 2, wherein each transducer assembly includes at least two transducers in the transducer assembly and each transducer housing includes at least two transducer apertures.

4. The ultrasonic flow meter of claim 3, wherein each pass-through aperture includes a wiring space along the diameter of the pass-through aperture configured to receive a transducer wire of a first transducer during passage of a second transducer through the pass-through aperture during the mounting of the flow measurement electronics to the electronics receptacle.

5. The ultrasonic flow meter of claim 4, wherein the transducers are prewired to the flow measurement electronics prior to mounting of the flow measurement electronics to the electronics receptacle.

6. The ultrasonic flow meter of claim 1, wherein transducer housing includes a cover plate enclosing the transducer housing to form a watertight transducer housing compartment within the transducer housing.

7. The ultrasonic flow meter of claim 6, wherein the cover plate is configured to enclose one or more wires connected between the one or more transducers and the measurement electronics.

8. The ultrasonic flow meter of claim 6, wherein the pass-through aperture is provided through a wall between the transducer housing compartment and the electronics chamber.

9. An ultrasonic flow meter body configured to facilitate replacement of flow measurement electronics, the flow meter body comprising:
    a conduit providing a flow passage through the flow meter body;
    an electronics receptacle configured to receive flow measurement electronics to form an electronics chamber;
    a plurality of transducer housings configured to receive transducer assemblies and position one or more transducers of the transducer assemblies relative to the conduit; and
    at least two pass-through apertures, each pass-through aperture providing an opening directly between the electronics chamber and a different transducer housing of the plurality of transducer housings.

10. The ultrasonic flow meter body of claim 9, wherein a diameter of the pass-through aperture is greater than a diameter of the transducers such that the transducers may be passed from the electronics chamber to the transducer housing through a pass-through aperture during the mounting of the flow measurement electronics to the electronics receptacle.

11. The ultrasonic flow meter body of claim 10, wherein each transducer assembly includes at least two transducers in the transducer assembly and each transducer housing includes at least two transducer apertures.

12. The ultrasonic flow meter body of claim 11, wherein each pass-through aperture includes a wiring space along the diameter of the pass-through aperture configured to receive a transducer wire of a first transducer during passage of a second transducer through the pass-through aperture during the mounting of the flow measurement electronics to the electronics receptacle.

13. The ultrasonic flow meter body of claim 12, wherein the transducers are prewired to the flow measurement electronics prior to mounting of the flow measurement electronics to the electronics receptacle.

14. The ultrasonic flow meter body of claim 9, wherein transducer housing includes a cover plate enclosing the transducer housing to form a watertight transducer housing compartment within the transducer housing.

15. The ultrasonic flow meter body of claim 14, wherein the cover plate is configured to enclose one or more wires connected between the one or more transducers and the measurement electronics.

16. The ultrasonic flow meter body of claim 14, wherein the pass-through aperture is provided through a wall between the transducer housing compartment and the electronics housing chamber.

17. An ultrasonic flow meter configured to facilitate replacement of flow measurement electronics, the flow meter comprising:
   flow measurement electronics including
      an electronics housing,
      an electronic circuit embodied on a printed circuit board, and
      a plurality of transducer assemblies transmitting and receiving ultrasonic waves through a flow for ultrasonic measurement of the flow,
      wherein the transducer assemblies are wired to the printed circuit board and the printed circuit board is potted within an electronics housing of the flow measurement electronics; and
   a flow meter body including
      a conduit providing a flow passage through the flow meter body,
      an electronics receptacle configured to receive the flow measurement electronics to form an electronics chamber,
      a plurality of transducer housings configured to receive transducer assemblies and position one or more transducers of the transducer assemblies relative to the conduit, and
      at least two pass-through apertures, each pass-through aperture providing an opening directly between the electronics chamber and a different transducer housing of the plurality of transducer housings.

18. The ultrasonic flow meter of claim 17, wherein a diameter of the pass-through aperture is greater than a diameter of the transducers such that the transducers may be passed from the electronics chamber to the transducer housing through a pass-through aperture during the mounting of the flow measurement electronics to the electronics receptacle.

19. The ultrasonic flow meter of claim 17, wherein transducer housing includes a cover plate enclosing the transducer housing to form a watertight transducer housing compartment within the transducer housing.

20. The ultrasonic flow meter of claim 19, wherein the pass-through aperture is provided through a wall between the transducer housing compartment and the electronics chamber.

* * * * *